United States Patent
Wang et al.

(10) Patent No.: US 8,976,474 B1
(45) Date of Patent: Mar. 10, 2015

(54) UNIVERSAL MODULATION CODING FOR A DATA CHANNEL

(71) Applicant: Seagate Technology LLC, Cupertino, CA (US)

(72) Inventors: Zheng Wang, Longmont, CO (US); Ara Patapoutian, Hopkinton, MA (US); Raman C. Venkataramani, Longmont, CO (US); Gil I. Shamir, Sewickley, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/045,584

(22) Filed: Oct. 3, 2013

(51) Int. Cl.
*G11B 20/14* (2006.01)
*G11B 20/16* (2006.01)
*G11B 5/09* (2006.01)
*H03M 7/00* (2006.01)

(52) U.S. Cl.
CPC .................................... *G11B 20/14* (2013.01)
USPC .............................................. 360/40; 341/50

(58) Field of Classification Search
None
See application file for complete search history.

(56) References Cited

U.S. PATENT DOCUMENTS

| | | | |
|---|---|---|---|
| 6,081,210 A | 6/2000 | Nikolic et al. | |
| 6,127,954 A | 10/2000 | Kim | |
| 6,275,176 B1 | 8/2001 | Bruekers et al. | |
| 6,839,004 B2 * | 1/2005 | Tsang | 341/59 |
| 7,164,371 B2 * | 1/2007 | Lee et al. | 341/58 |
| 2006/0106901 A1 * | 5/2006 | Guionnet et al. | 708/200 |

OTHER PUBLICATIONS

Howard et al., "Arithmetic Coding for Data Compression," Proceedings of the IEEE, vol. 82, No. 6, Jun. 1994, 9 pgs.

* cited by examiner

*Primary Examiner* — Regina N Holder
(74) *Attorney, Agent, or Firm* — Taylor English Duma, LLP

(57) ABSTRACT

Technologies are described herein for implementing a universal modulation coding mechanism for a data channel. A user data sequence comprising a first number of bits is received. The user data sequence is encoded into a codeword sequence comprising a second number of bits utilizing a modulation encoder. The modulation encoder may encode the user data sequence based on a set of Markov state transition probabilities. The modulation encoder may implement a data de-compressor algorithm from a lossless data compression scheme. The codeword sequence is output to the data channel. The codeword sequence is subsequently received from the data channel, and the user data sequence is decoded from the codeword sequence utilizing a modulation decoder. The modulation decoder may decode the user data sequence based on the same set of Markov states transition probabilities. The modulation de-coder may implement the data compressor algorithm from the lossless data compression scheme.

20 Claims, 6 Drawing Sheets

UNIVERSAL MODULATION CODING FOR A DATA CHANNEL

BRIEF SUMMARY

The present disclosure relates to technologies for implementing a universal modulation coding mechanism for a data channel. The universal modulation coding mechanism may be implemented in the magnetic recording channel of a storage device, such as a hard-disk drive ("HDD"), or other electronic systems where data channels are utilized to communicate between components, such as wireless systems. The universal modulation coding mechanism may be based on Markov state transition probabilities. The universal modulation coding mechanism may further implement a reversed lossless data compression scheme. According to some embodiments, a method comprises receiving a user data sequence comprising a first number of bits, encoding the user data sequence into a codeword sequence comprising a second number of bits utilizing a data de-compressor based on the lossless data compression scheme and outputting the codeword sequence to a data channel. The codeword sequence is subsequently received from the data channel, and the user data sequence decoded from the codeword sequence utilizing a data compressor based on the same lossless data compression scheme.

According to further embodiments, an apparatus for implementing a universal modulation coding mechanism comprises a storage area containing a set of Markov state transition probabilities, a modulation encoder, and a modulation decoder. The modulation encoder is configured to receive a user data sequence comprising a first number of bits, encode the user data sequence into a codeword sequence comprising a second number of bits based on the set of Markov state transition probabilities, and provide the codeword sequence to a magnetic recording channel of a storage device. The modulation decoder is configured to receive the codeword sequence from the magnetic recording channel and decode the user data sequence from the codeword sequence based on the same set of Markov state transition probabilities.

According to further embodiments, a system comprises a hard disk drive having a magnetic recording channel and a universal modulation encoder/decoder having a storage area containing a set of Markov state transition probabilities. The universal modulation encoder/decoder is configured to receive a user data sequence, encode the user data sequence into a codeword sequence utilizing an arithmetic decoder based on the set of Markov state transition probabilities, and provide the codeword sequence to the magnetic recording channel. The universal modulation encoder/decoder is further configured to receive the codeword sequence from the magnetic recording channel and decode the user data sequence from the codeword sequence utilizing an arithmetic encoder based on the predetermined Markov state transition probabilities.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
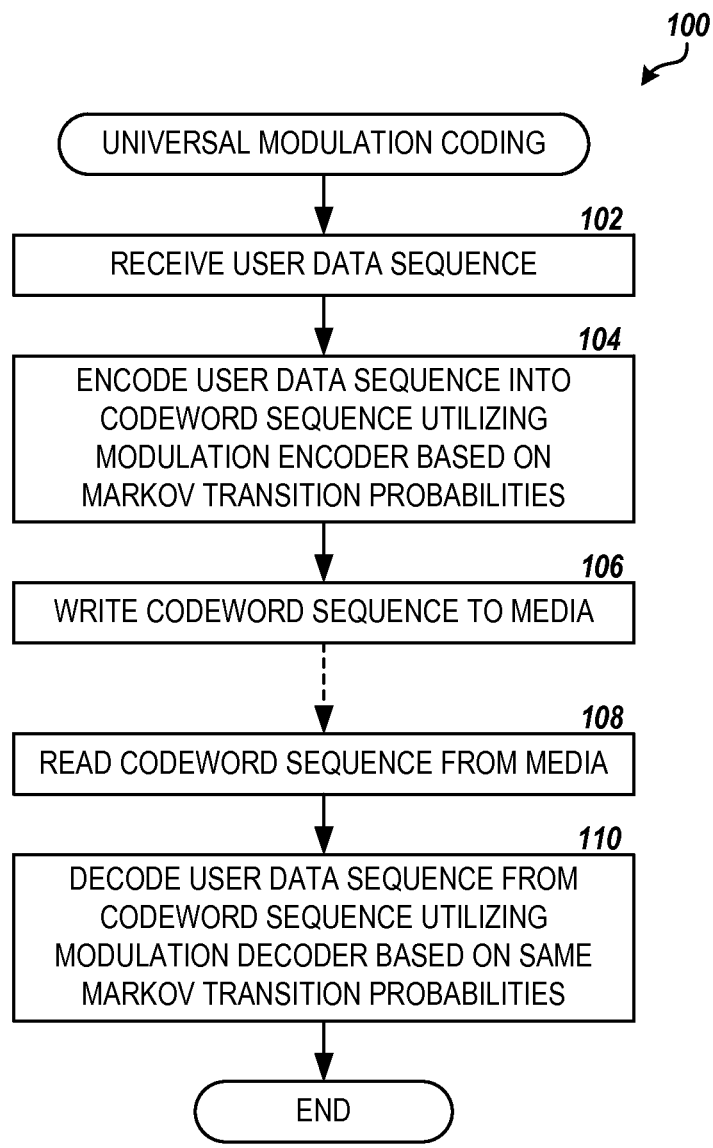
FIG. 1 is a flow diagram showing one method of utilizing a universal modulation coding mechanism based on Markov state transition probabilities in a storage device, according to embodiments described herein.

The following detailed description is directed to a universal modulation coding mechanism for a data channel. According to some embodiments, the universal modulation coding mechanism may be implemented in the magnetic recording channel of a storage device, such as a hard-disk drive ("HDD"). The HDD may receive sequences of user data to be stored on the recording media of the device. The HDD converts these user data sequences through a magnetic recording channel to a signal that is written to the magnetic recording surface of the media. The signal may be later read from the magnetic recording surface and converted back to the user data sequence through the magnetic recording channel for retrieval. The universal modulation coding mechanism may also be implemented in other electronic systems where data channels are utilized to communicate between components, such as wireless systems, and the reading/writing aspects are supplanted by sending/receiving aspects.

Like all data channels, the magnetic recording channel of an HDD may introduce noise into the signals conveyed to and from the media, such as transition noise caused by intergranular magnetic coupling. To mitigate noise in the channel and reduce resulting read/write errors, user data sequences may first be encoded into codeword sequences before being written to the media. This is referred to as modulation coding. Upon subsequent reading of the codeword sequences from the media, the codeword sequences are decoded back to the user data sequence using a complimentary decoder. The modulation coding schemes and techniques utilized are designed with constraints imposed on the codeword sequences that avoid patterns or bit sequences that are prone to generate errors in the channel.

Several types of modulation coding schemes are commonly utilized in the magnetic recording channel of a HDD device, including run-length limited ("RLL") and running digital sum ("RDS") codes, which that limit the number of consecutive ones and zeroes ("1s and 0s") in the codeword sequences, maximum transition run ("MTR") codes, which limit the number of consecutive transitions allowed in the channel signal, and other coding schemes that implement these and/or other constraints. Conventional modulation coding schemes may be implemented in the read/write channel of the HDD device using simple algorithms or lookup tables.

Typically, a HDD or other storage device will implement only a single modulation coding scheme in the hardware of the device that was designed to impose a fixed set of constraints and cannot be changed or adjusted to account for the individual channel characteristics of a device or class of devices. In addition, conventional modulation coding schemes are capable of generating only deterministic constraints, which are known to be non-optimal for most channel conditions. Analysis has shown that appropriately chosen probabilistic constraints (where different patterns occur with different probabilities) may provide additional signal gain in the magnetic recording channel, for example.

Utilizing the technologies described herein, a universal (programmable) modulation coding mechanism may be implemented in a storage device which utilizes Markov state transition probabilities to generate either deterministic or probabilistic Markov-constrained codeword sequences. A Markov constraint may be characterized by a finite number of states and the corresponding state transition probabilities. In some embodiments, the universal modulation coding mechanism may implement both deterministic and probabilistic constraints. Probabilistic constraints seek to minimize certain patterns in the generated codeword sequences without eliminating the patterns altogether, as would be the case with deterministic constraints.

According to some embodiments, the Markov state transition probabilities may be stored in a memory of the read/write channel, allowing the modulation coding scheme to be adjusted according to the particular channel characteristics of the storage device or components therein. In addition, the transition probabilities stored in the memory may be modifiable, allowing the coding scheme to be updated based on testing of the device or in order to add, remove, or modify constraints.

According to further embodiments, the universal modulation coding mechanism may adapt a lossless data compression scheme, such as an entropy coding scheme, to modulation coding by reversing the data compressor and the data de-compressor. In other words, the data de-compressor (e.g. entropy decoder) is utilized as the modulation encoder to generate the codeword sequences from the user data sequences, while the data compressor (e.g. entropy encoder) is utilized as the modulation decoder to decode the user data sequences from the codeword sequences. In some embodiments, an arithmetic coding algorithm may be implemented by the data de-compressor (entropy decoder) and data compressor (entropy encoder).

FIG. 1 provides additional details regarding the universal modulation coding mechanism. Specifically, FIG. 1 illustrates one routine 100 for utilizing a universal modulation coding mechanism based on Markov state transition probabilities in a storage device, according to some embodiments. The routine 100 may be performed in conjunction with the write and subsequent read of user data sequences to/from the magnetic recording media of the storage device, for example. According to some embodiments, the routine 100 may be performed in the magnetic read/write channel of the storage device.

The routine 100 begins at step 102, where a user data sequence is received to be written to the recording media of the storage device. The user data sequence may consist of a sequence of 1s and 0s of constant length L, as will be described in more detail below. From step 102, the routine 100 proceeds to step 104, where a codeword sequence of length constant length N is generated from the user data sequence utilizing a modulation encoder based on a set of Markov state transition probabilities. The Markov state transition probabilities may implement either probabilistic constraints, deterministic constraints, or both. According to some embodiments, N>L.

The routine proceeds from step 104 to step 106, where the generated codeword sequence is written to the recording media via the magnetic recording channel of the storage device. As shown at step 108, the codeword sequence is subsequently read from the recording media of the storage device, and the routine 100 proceeds to step 110, where the codeword sequence is decoded by the modulation decoder the same set of Markov state transition probabilities to recover the user data sequence. From step 110, the routine 100 ends.

Figure 2:
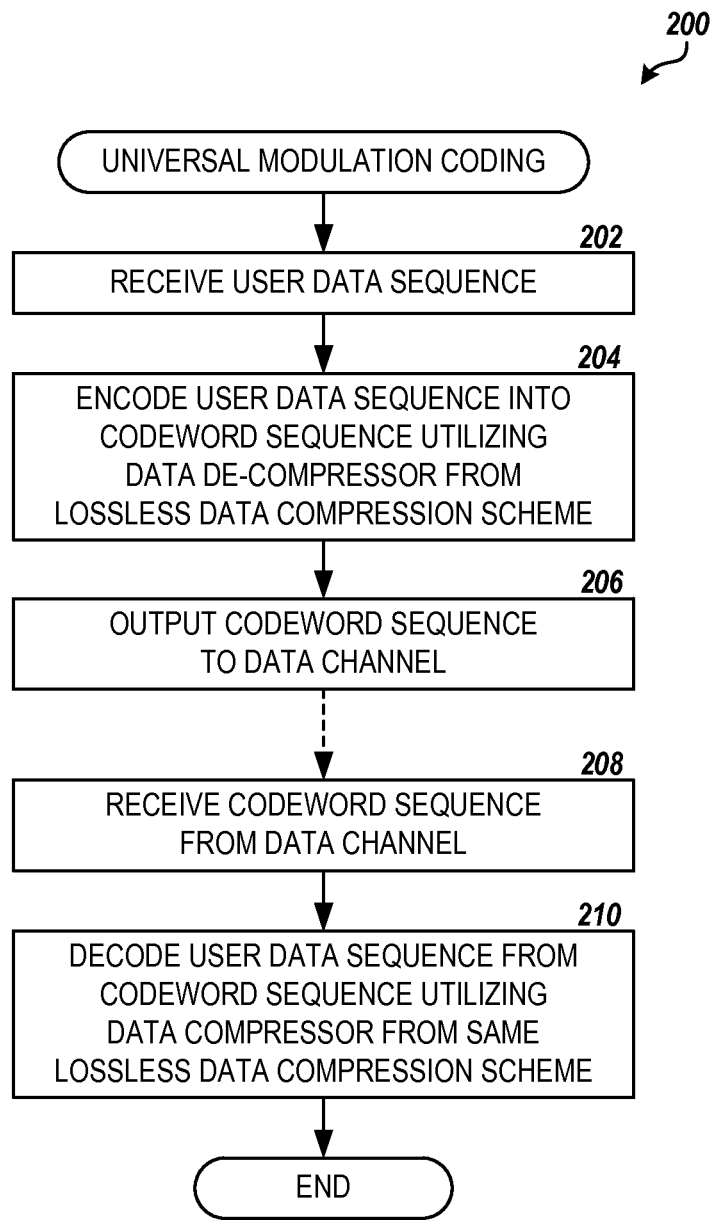
FIG. 2 is a flow diagram showing one method of utilizing a universal modulation coding mechanism implemented utilizing a reversed lossless data compression scheme, according to embodiments described herein.

FIG. 2 illustrates another routine 200 for utilizing a universal modulation coding mechanism based on a reversed lossless data compression scheme for a data channel, according to some embodiments. The routine 200 may be performed in conjunction with the write and subsequent read of user data sequences via the magnetic recording channel of a storage device, for example. According to some embodiments, the routine 200 may be performed in the magnetic read/write channel of the storage device.

The routine 200 begins at step 202, where a user data sequence is received to be sent through the data channel. The user data sequence may consist of a sequence of 1s and 0s of constant length L. From step 202, the routine 200 proceeds to step 204, where a codeword sequence of length constant length N is generated from the user data sequence utilizing a modulation encoder that implements the data de-compressor algorithm from the lossless data compression scheme. In some embodiments, N>L.

The routine proceeds from step 204 to step 206, where the generated codeword sequence is output to the data channel. As shown at step 208, the codeword sequence is subsequently received through the data channel, and the routine 200 proceeds to step 210, where the codeword sequence is decoded by a modulation decoder implementing the data compressor algorithm from the lossless data compression scheme to recover the user data sequence. From step 110, the routine 100 ends.

Figure 3:
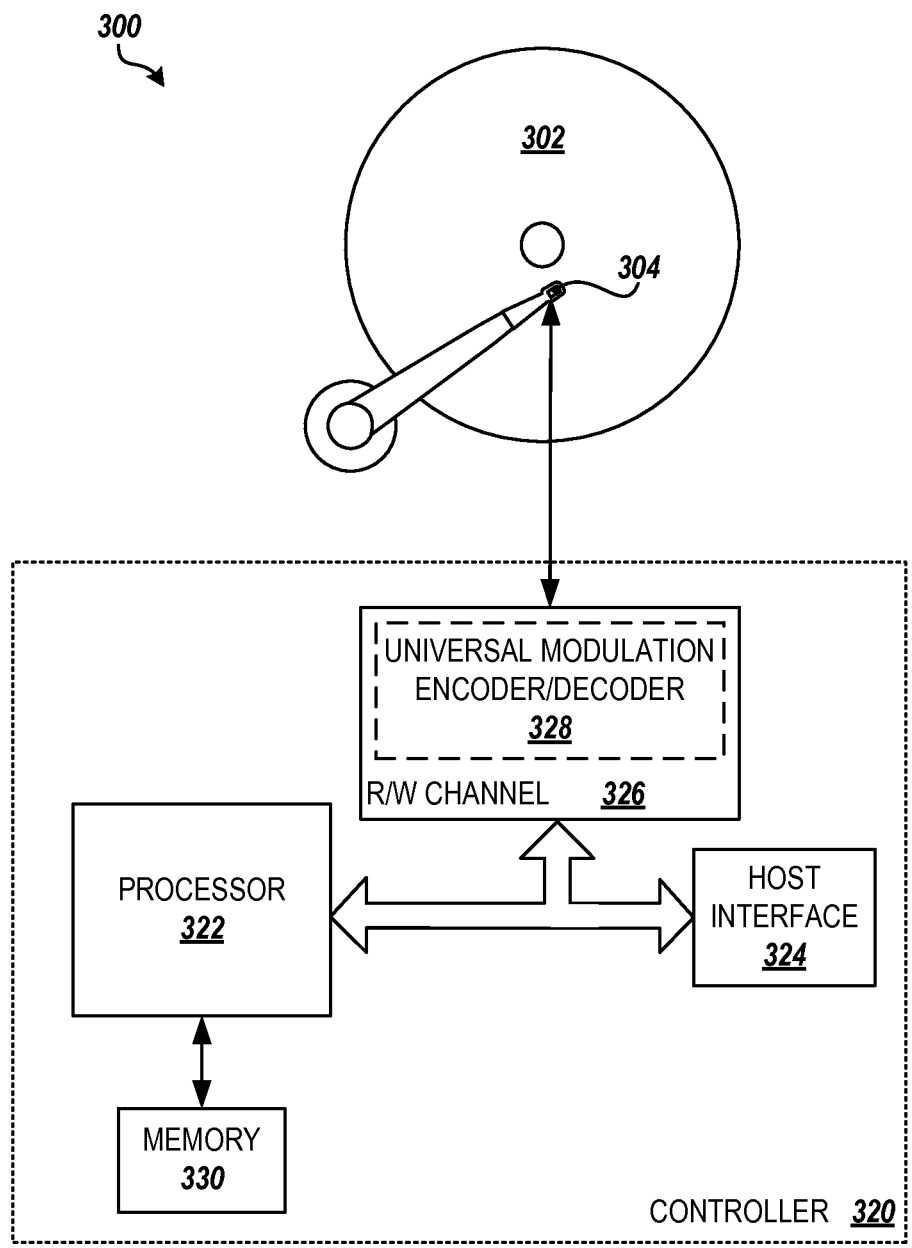
FIG. 3 is a block diagram showing an illustrative environment for implementing a universal modulation coding mechanism in a storage device, according to embodiments described herein.

FIG. 3 and the following description are intended to provide a general description of a suitable environment in which the embodiments described herein may be implemented. In particular, FIG. 3 shows an illustrative storage device 300, such as an HDD apparatus, along with hardware, software and components for implementing a universal modulation coding mechanism for a magnetic data channel of the storage device, according to the embodiments provided herein. The storage device 300 may include recording media comprising at least one platter or disk 302.

The storage device 300 further includes at least one read/write head 304 located adjacent to a magnetic recording surface of each disk 302. The read/write head 304 may read information from the disk 302 by sensing a magnetic field formed on portions of the surface of the disk, and may write information to the disk by magnetizing a portion of the surface of the disk. It will be appreciated by one of ordinary skill in the art that the read/write head 304 may comprise multiple components, such as a magneto-resistive ("MR") or tunneling MR reader element, an inductive writer element, a slider, multiple sensors, and the like.

The storage device 300 may further comprise a controller 320 that controls the operations of the storage device. The controller 320 may include a processor 322. The processor 322 may implement a host interface 324 allowing the storage device 300 to communicate with a host device, other parts of storage device 300, or other components, such as a server computer, personal computer ("PC"), laptop, tablet, game console, set-top box or any other electronics device that can be communicatively coupled to the storage device 300 to store and retrieve data from the storage device. The processor 322 may process write commands from the host device by formatting the associated data and transfer the formatted data via a read/write channel 326 through the read/write head 304 and to the magnetic recording surface of the disk 302. The processor 322 may further process read commands from the host device by determining the location of the desired data on the surface of the disk 302, moving the read/write head(s) 304 over the determined location, reading the data from the surface of the disk via the read/write channel 326, correcting any errors and formatting the data for transfer to the host device.

The read/write channel 326 may convert data between the digital signals processed by the processor 322 and the analog signals conducted through the read/write head 304 for reading and writing data to the surface of the disk 302. The analog signals to and from the read/write head 304 may be further processed through a pre-amplifier circuit. The read/write channel 326 may further provide servo data read from the disk 302 to an actuator to position the read/write head 304. The read/write head 304 may be positioned to read or write data to a location on the surface of the disk 302 by moving the read/write head 304 radially across the disk using the actuator while a motor rotates the disk to bring the target location under the read/write head.

The controller 320 may further contain a universal modulation encoder/decoder 328. According to some embodiments, the universal modulation encoder/decoder 328 may implement the universal modulation coding mechanism described herein. The universal modulation encoder/decoder 328 may comprise a hardware circuit in the read/write channel 326, processor-executable instructions for execution in the processor 322, or any combination of these and other components in the controller 320. As described herein, the universal modulation encoder/decoder 328 may encode user data sequences to codeword sequences before the data is written to disk. The codeword sequences read from disk may also be decoded back to the user data sequence by the universal modulation encoder/decoder 328. According to embodiments, the encoding and decoding tasks of the universal modulation encoder/decoder 328 are driven by one or more sets of Markov state transition probabilities, as will be described in more detail below in regard to FIG. 4.

The controller 320 may further include a computer-readable storage medium or "memory" 330 for storing processor-executable instructions, data structures and other information. The memory 330 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the memory 330 may store a firmware that comprises commands and data necessary for performing the operations of the storage device 300. In addition to the memory 330, the environment may include other computer-readable media storing program modules, data structures, and other data described herein for implementing a universal modulation coding mechanism in the storage device 300 that utilizes Markov state transition probabilities.

It will be appreciated by those skilled in the art that computer-readable media can be any available media that may be accessed by the controller 320 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, EPROM, EEPROM, FLASH memory or other solid-state memory technology; CD-ROM, DVD, BLU-RAY, or other optical storage; magnetic cassettes, magnetic tape, magnetic disk storage, or other magnetic storage devices; and the like.

It will be appreciated that the structure and/or functionality of the storage device 300 may be different than that illustrated in FIG. 3 and described herein. For example, the processor 322, read/write channel 326, memory 330 and other components and circuitry of the storage device 300 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 300 may not include all of the components shown in FIG. 3, may include other components that are not explicitly shown in FIG. 3 or may utilize an architecture completely different than that shown in FIG. 3.

Figure 4:
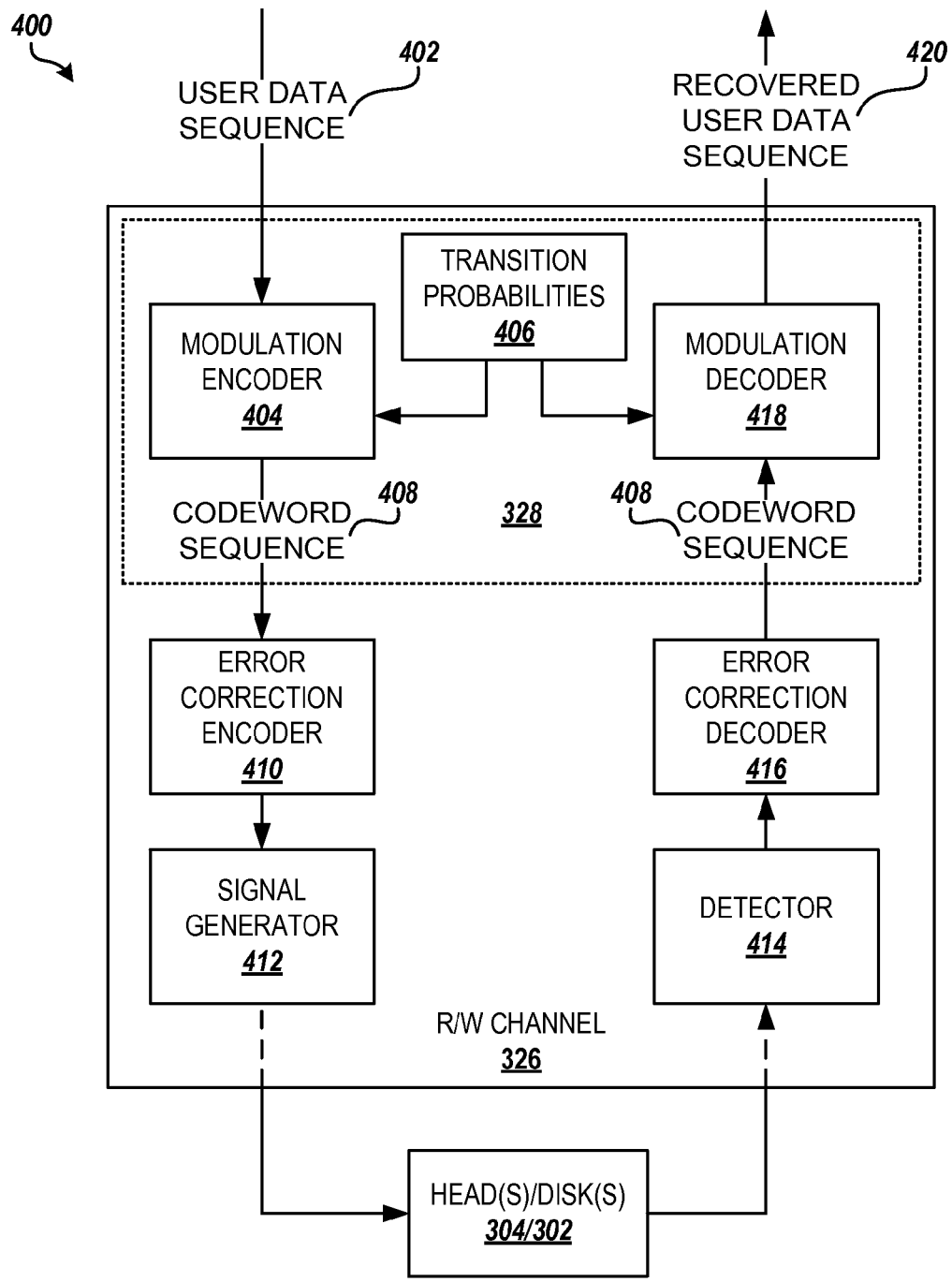
FIG. 4 is a block diagram showing additional details regarding a magnetic recording channel of a storage device having a universal modulation coding mechanism, according to embodiments described herein.

FIG. 4 shows an illustrative magnetic recording channel 400 of a storage device 300 having a universal modulation coding mechanism based on Markov state transition probabilities, according to some embodiments described herein. As used herein, the magnetic recording channel 400 may refer to a combination of the read/write channel 326 and the read/write head(s) 304 and disk(s) 302 of the storage device 300, including any intervening signal equalizers, amplifiers, and/or other components not shown in FIG. 4. According to embodiments, the magnetic recording channel 400 receives a user data sequence 402 to be stored on the recording media or disk 302 of the storage device 300. As described above, the user data sequence 402 may comprise a sequence of 1s and 0s. The user data sequence 402 may be received from the host device through the host interface 324 and/or from the processor 322.

As is known in the art, the user data sequence 402 is processed and converted to a data signal to be written to the magnetic recording surface of a disk 302 through the corresponding read/write head 304 by the read/write channel 326 of the controller 320. According to embodiments, this processing includes modulation coding of the user data sequence 402 to a codeword sequence 408 for writing to disk. This may be accomplished by modulation encoder 404 component of the universal modulation encoder/decoder 328 described above in regard to FIG. 3. The modulation encoder 404 utilizes a set of Markov state transition probabilities 406 to encode the user data sequence 402 to the codeword sequence 408.

Each set of transition probabilities 406 comprises a set of probabilities $\{Pr_{si,sj}\}$ of bits or bit patterns in the user data sequence 402 transitioning from state $S_i$ to state $S_j$, i, j∈{0, 1, 2, ..., K} for K defined states. An arbitrary Markov constraint can be imposed on the codeword sequence 408 generated by the modulation encoder 404 by controlling the number K of states and the set of transition probabilities $\{Pr_{si,sj}\}$. The number K of states is based on the size of the bit patterns in the Markov model. For example, using bit patterns of 4 bits yields K=16 states, with each state representing the most recent 4 bits in the user data sequence. The Markov model in this example further yields a set $\{Pr_{si,sj}\}$ of 32 transition probabilities, with each pair of binary branch transition probabilities representing the probability that the next bit in the user data sequence is a 1 or a 0 given the current state of the four bits $S_i$. The transition probabilities for the exemplary 4-bit Markov model described above may be provided in a tabular form, as shown below in TABLE 1:

TABLE 1

Transition Probabilities for 4-bit Markov Model

| State ($S_i$) | Pr next bit = 0 | Pr next bit = 1 |
|---|---|---|
| 0000 | 0.54311 | 0.45689 |
| 0001 | 0.42888 | 0.57112 |
| 0010 | 0.64192 | 0.35808 |
| 0011 | 0.45547 | 0.54453 |
| 0100 | 0.56377 | 0.43623 |
| 0101 | 0.28814 | 0.71186 |
| 0110 | 0.58419 | 0.41581 |
| 0111 | 0.46677 | 0.53323 |
| 1000 | 0.53139 | 0.46861 |
| 1001 | 0.41475 | 0.58525 |
| 1010 | 0.71158 | 0.28842 |
| 1011 | 0.43471 | 0.56529 |
| 1100 | 0.54530 | 0.45470 |
| 1101 | 0.35455 | 0.64545 |
| 1110 | 0.57166 | 0.42834 |
| 1111 | 0.45734 | 0.54266 |

The codeword sequence 408 generated by the modulation encoder 404 may then be further processed by the read/write channel 326, such as by adding error correction information by way of an error correction encoder 410, before being converted to a signal by a signal generator 412. The signal may then be written to the magnetic recording surface of the disk 302 via the writer element of the read/write head 304. Similarly signals read from the disk 302 by the reader element of the read/write head 304 may be converted back to a digital signal by a detector 414, and then further processed by the read/write channel 326 to recover the codeword sequence 408. This processing may include recovering from data errors in the read signal by utilizing a complimentary error correction decoder 416, for example. The recovered codeword sequence 408 is then decoded by a complimentary modulation decoder 418 component of the universal modulation encoder/decoder 328 utilizing the same set of Markov state transition probabilities 406 used by the modulation encoder 404 to recover the user data sequence 420. The recovered user data sequence 420 may then be provided back to the processor 322 and/or host device.

According to some embodiments the universal modulation encoder/decoder 328 adapts a lossless data compression to perform the modulation coding by reversing the data compressor and the data de-compressor. In other words, the modulation encoder 404 implements the data de-compressor scheme, and the modulation decoder 418 implements the data compressor scheme. For example, the modulation encoder 404 may implement an entropy decoder, such as an arithmetic decoder, based on the provided transition probabilities 406, and the modulation decoder 418 may implement an entropy encoder, such as an arithmetic decoder, based on the same transition probabilities. It will be appreciated that other compression or entropy coding schemes could also be utilized in a reverse fashion to implement the modulation encoder 404 and modulation decoder 418, and it is intended that this application include all such coding schemes and implementations.

Unlike conventional modulation coding schemes, the universal modulation encoder/decoder 328 may further encode user data sequences of any length. In some embodiments, the universal modulation encoder/decoder 328 may be configured to encode an entire unit of stored data, such as a sector of a HDD, into a single codeword sequence 408. For a storage device 300 with a fixed sector size, the modulation encoder 404 may encode user data sequences of length L, wherein the resulting codeword sequence is N is equal to or less than the sector size. According to some embodiments, the universal modulation encoder/decoder 328 may be configured such that L and N both constant, i.e., the modulation encoding process is a fixed-length mapping. The modulation code rate R of the modulation encoder 404 is defined by R=L/N, and is therefore configurable through the configuration of L and N.

In some embodiments, the transition probabilities 406 are "programmable," allowing for different Markov constraints to be implemented in a particular storage device 300 by reconfiguring or changing the sets of transition probabilities 406 stored in the read/write channel 326 without requiring a change to the underlying hardware components implementing the modulation encoder 404 and modulation decoder 418. For example, the transition probabilities 406 may be stored in a non-volatile storage area of the read/write channel 326, such as an EEPROM, FLASH memory, FPGA, or other non-volatile, rewritable data storage component. This may allow the universal modulation encoder/decoder 328 to be modified based on the channel characteristics of the magnetic recording channel 400 of the storage device 300 or class of storage devices, for example.

The Markov state transition probabilities 406 may be configured to cover a large class of constraints on the generated codeword sequences 408. For example, the Markov state transition probabilities 406 could be configured to include a K-constraint to limit the maximum number of consecutive 0s and/or 1s in modulation codewords. In addition, the value of K may be configurable through the configuration of the transition probabilities 406. Similarly, the transition probabilities 406 could be configured to include a configurable Nyquist constraint to control number of consecutive transitions in the codeword sequence. The transition probabilities 406 could be configured to impose other deterministic constraints, such as those implemented by conventional MTR and RDS modulation coding schemes, but with configurable parameters.

The transition probabilities 406 could also be configured to impose probabilistic constraints in lieu of or in addition to deterministic constraints. It will be appreciated that the use of probabilistic constraints allows the generation of better coding rates (i.e. less redundancy) and fewer errors based on the individual channel characteristics. In some embodiments, the transition probabilities 406 could be configured to include hybrid probabilistic and deterministic constraints. For example, the transition probabilities 406 may be configured such that the number of consecutive transitions in the generated codeword sequences 408 are likely to be under threshold A, but guaranteed to be under threshold B. It will be further appreciated that the optimal transition probabilities 406 for any given storage device is based on the various channel characteristics of the magnetic recording channel 400.

In further embodiments, the Markov state transition probabilities 406 may further be utilized by an inter-symbol interference ("ISI") compensation mechanism in the read/write channel 326. For example, each transition probability in the set of transition probabilities 406 may be converted to an additive bias for the ISI compensation mechanism on the corresponding branch metric.

In reversing the arithmetic coding scheme to implement the modulation encoder 404 and modulation decoder 418, as described above, several resulting anomalies may be taken into account in the implementation, according to further embodiments. For example, in arithmetic coding with integer implementation, all numbers may be represented by P-bit integers, where P is a positive integer. This prevents the arithmetic encoder from outputting sequences with P leading 1s. Thus, in the universal modulation coding mechanism implemented with the reverse arithmetic coding scheme, user data sequences 402 with P leading 1s are forbidden as the input of modulation encoder 404 (arithmetic decoder). In other words, if the user data sequence 402 has P leading 1, the modulation decoder 418 (arithmetic encoder) is not able to recover the sequence successfully. In some embodiments, the modulation encoder 404 may insert a 0 in front of each user data sequence 402 in order to address this issue. This would avoid the forbidden user data sequence pattern while requiring only one additional bit of overhead. When the user data sequence length is long, such as an entire sector's worth of data (≈32 Kb), this overhead is negligible.

In another example, the modulation decoder 418 (arithmetic encoder) will generate the bits $\{\hat{x}_1, \hat{x}_2, \ldots, \hat{x}_{L'}\}$ of the recovered user data sequence 420, with L'>L. The decoded sequence will necessarily have one of the following two patterns: (a) $\{x_1, x_2, \ldots, x_L, 0, \ldots, 0\}$ (the original user data sequence), or (b) $\{x_1, x_2, \ldots, x_T, 0, 1, \ldots, 1\}$ (only the first T bits of the original user data sequence, with T<L). This uncertainty is caused by the reversed arithmetic encoding/decoding process. It may be seen that the first L bits of the two sequences (a) and (b) are not the same, differing in the ending bits. If we just take the first L decoded bits as the recovered user data sequence 420, there may be ending bit errors if sequence (b) was generated by the modulation decoder 418 (arithmetic encoder).

In order to account for the possibility of sequence (b) in the decoded bits, the modulation decoder 418 may be configured to check the value of the $(L+1)^{th}$ decoded bit. If the value is 0, it implies the occurrence of sequence (a). The modulation decoder 418 may then ignore the ending 0s in sequence (a) and output $\{x_1, x_2, \ldots, x_L\}$ as the recovered user data sequence 420. If the value of the $(L+1)^{th}$ is 1, it implies the occurrence of sequence (b). The modulation decoder 418 may convert the sequence (b) to the sequence (a) by mathematically adding 1 to it. The ending bits of sequence (b) are flipped from $\{\ldots, 0, 1, \ldots, 1\}$ to $\{\ldots, 1, 0, \ldots, 0\}$, and the first L decoded bits may be returned as the recovered user data sequence 420.

In addition, data compressors such as the arithmetic coding scheme described above often use variable-length mapping. However, in a typical HDD, the modulation coding scheme utilizes fixed-length mapping since the sector size is usually fixed. As described above, the codeword length N should be equal to or less the sector size, so the length L of user data sequences 402 may be limited to ensure N≤sector size. For a user data sequence 402 of $\{x_1, x_2, \ldots, x_L\}$ with length L, the modulation encoder 404 (arithmetic decoder) is configured to stop encoding after generating N encoded bits $\{y_1, y_2, \ldots, y_N\}$ of the codeword sequence 408.

During modulation decoding, however, the modulation decoder 418 (arithmetic encoder) decodes the codeword sequence 408 $\{y_1, y_2, \ldots, y_N\}$ read from the disk 302 and recovers L' bits $\{\hat{x}_1, \hat{x}_2, \ldots, \hat{x}_{L'}\}$ of the user data sequence 420. Since arithmetic encoding is a variable-length mapping, L' may take different values depending on the (Markov) statistics of sequence $(y_1, y_2, \ldots, y_N)$. The modulation decoder 418 (arithmetic encoder) may recover the user data sequence 420 successfully only when the number of decoded bits is no less than the number of bits in the original user data sequence 402, i.e. when L'≥L. The first L bits $\{\hat{x}_1, \hat{x}_2, \ldots, \hat{x}_L\}$ are the estimate of the user sequence. If not enough decoded bits are generated at the decoder (L'<L), user sequence will not be fully recovered.

According to some embodiments, to prevent unrecoverable user data sequences at the modulation decoder 418, the modulation encoder 404 is configured to determine the number of decoded bits L' from the probability of the codeword sequence $Pr\{y_1, y_2, \ldots, y_N\}$ based on the transition probabilities 406 utilizing the formula:

$$L' = \lfloor \log_2 Pr\{y_1, y_2, \ldots, y_N\} \rfloor$$

If L'<L, then the generated codeword sequence 408 from the modulation encoder 404 will not be successfully decoded by the modulation decoder 418, and an encoder failure will be raised. The modulation encoding process for a fixed N is therefore probabilistic depending on the pattern/statistics of the generated codeword sequence. In other embodiments, the codeword sequence 408 generated by the modulation encoder 404 may be decoded by the modulation decoder 418 before the codeword sequence is written to disk. The number of decoded bits L' may then be compared to the length L of the user data sequence 402 to ensure L'≥L. Otherwise, an encoder failure is raised. Taking into account the extra decoded bit required to identify sequence (b) output by the modulation decoder 418 (arithmetic encoder) as described above, the modulation decoder 418 may be configured to raise an encoding error when L'≤L, instead of when L'<L, according to some embodiments.

In other embodiments, the HDD may have a variable sector size. For a fixed length L, different user sequence patterns may generate different codeword lengths N, and therefore different code rates R. For higher values of R (less redundancy), further gain may be achieved from the space savings. However, some overhead may be added for each sector to store the individual R value.

Figure 5:
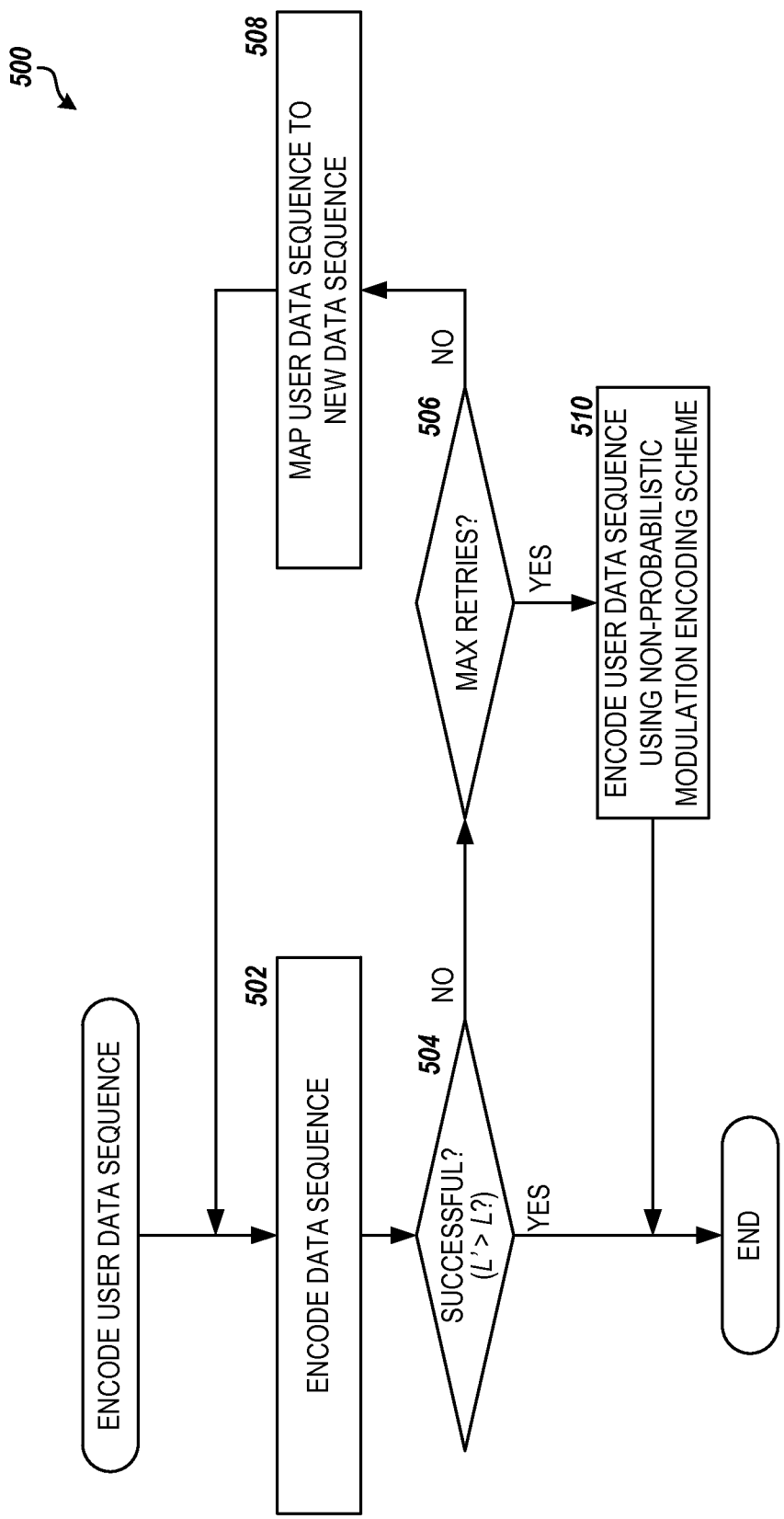
FIG. 5 is a flow diagram showing a serial encoding routine for a modulation encoder of a universal modulation coding mechanism, according to embodiments described herein.

It will be appreciated that there exists a tradeoff between the modulation code rate R and the encoding failure rate. The closer R approaches the entropy of the Markov source (constraint), the higher the probability that a single encoding process may fail. In order to allow for the most efficient modulation code rate R, the universal modulation encoder/decoder 328 may further be configured to handle encoder failures, such as those described above, in order to cope with probabilistic encoding. According to some embodiments, a serial encoding routine 500 may be implemented in the modulation encoder 404, as shown in FIG. 5. As shown at step 502, the modulation encoder 404 may first encode the user data sequence 402 based on the transition probabilities 406, as described above. Next, at step 504, if encoding is successful, i.e. L'>L, then the routine 500 ends and the codeword sequence 408 is sent to the error correction encoder 410.

If encoding fails, the routine 500 proceeds from step 504 to step 506, where the modulation encoder 404 determines whether some threshold criterion of encoding failures has been met, such as whether a maximum number of retries has been reached, for example. If the maximum number of retries has not been reached, the routine 500 proceeds to step 508, where the modulation encoder 404 maps the user data sequence 402 is mapped to a new sequence. The routine 500 then returns to step 502, where the modulation encoder 404 retries the encoding process with the new data sequence. In some embodiments, the modulation encoder 404 may map the user data sequence 402 to a sequence known to be able to be successfully encoded on the next try. However such a mapping function may be very complicated and expensive to implement. In other embodiments, the modulation encoder 404 may simply map the user data sequence 402 to a new random sequence. Assuming that the single encoding failure rate of the modulation encoder 404 is F %, and the maximum number of encoding retries is M the serial encoding failure rate, i.e. the probability that encoding still fails after M retries, is $(F\%)^{M+1}$. By adjusting the values of M and F, such as by changing the modulation code rate R, for example, the serial encoding failure rate can be controlled to be arbitrarily small.

If, at step 506, the maximum number of retries M has been reached, then the routine 500 proceeds to step 510, where the modulation encoder 404 encodes the original user data sequence 402 utilizing a non-probabilistic encoding scheme, such as a conventional RDS coding scheme. According to some embodiments, the non-probabilistic encoding scheme will have a modulation code rate R greater than L/N. From step 510, the routine 500 ends. It will be appreciated that some overhead information, such as the encoder (probabilistic or non-probabilistic) utilized to generate the codeword sequence 408 and the mapping (if any) used for the user data sequence 402, may be included with the encoded codeword sequence and stored on the disk 302 in order for the modulation decoder 418 to decode the recovered codeword sequence and perform the necessary reverse mapping of the decoded sequence back to the original user data sequence 420.

Figure 6:
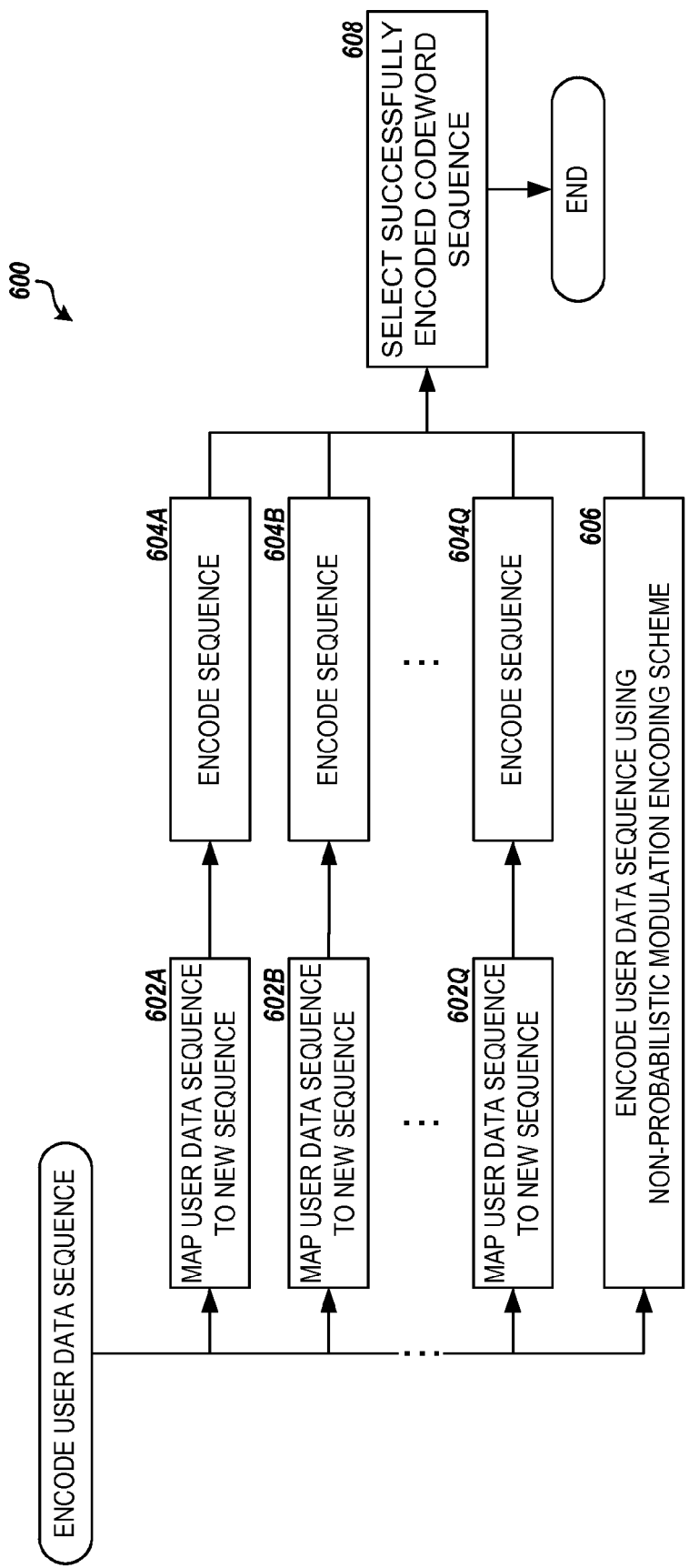
FIG. 6 is a flow diagram showing a parallel encoding routine for a modulation encoder of a universal modulation coding mechanism, according to embodiments described herein.

In other embodiments, a parallel encoding routine 600 may be implemented in the modulation encoder 404, as shown in FIG. 6. In the parallel encoding routine 600, the user data sequence 402 is mapped to some number Q new, distinct sequences in parallel, as shown at steps 602A-602Q. Each new sequence is then encoded in parallel by Q identical encoders, as shown at steps 604A-604Q. In addition, the modulation encoder 404 encodes the user data sequence 402 utilizing a non-probabilistic encoding scheme, such as a conventional RDS coding scheme, in parallel with the other encoding operation, as shown at step 606. Finally, at step 608 the modulation encoder 404 selects the encoded codeword sequence 408 from among the parallel encoders at steps 604A-604Q that were successful to pass to the error correction encoder 410. If none of the encoders successfully encoded the mapped sequence, then the modulation encoder 404 selects the codeword sequence 408 generated by the non-probabilistic modulation encoder at step 606 to pass to the error correction encoder 410. From step 608, the routine 600 ends.

While the parallel encoding routine 600 may provide better performance for the modulation encoder 404 over the serial encoding routine 500, it may also be more expensive to implement in the universal modulation encoder/decoder 328 of the storage device. In further embodiments, a hybrid encoding routine may be utilized by the modulation encoder, with some of the probabilistic modulation encoders being executed serially while others are executed in parallel, This may allow adaptation of the modulation encoder 404 to different channel conditions, implementation environments, or transition probabilities.

Based on the foregoing, it will be appreciated that technologies for implementing a universal modulation coding mechanism for a data channel are presented herein. While the universal modulation coding mechanism is described above as being utilized with the magnetic recording channel of a storage device, it will be appreciated that the universal modulation coding mechanism may be utilized in any device or set of devices having a data channel requiring modulation encoding of user data sequences, including transmitting and receiving devices, and the like. Further, while embodiments are described herein in regard to an HDD device, it will be appreciated that the embodiments described in this disclosure may be utilized in any storage device containing a recording channel, including but not limited to, a magnetic disk drive, a hybrid magnetic and solid state drive, a magnetic tape drive, an optical disk storage device, an optical tape drive and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. An apparatus for implementing a universal modulation coding mechanism, the apparatus comprising:
    a storage area containing a set of state transition probabilities;
    a modulation encoder configured to perform the steps of
        receiving a data sequence comprising a first number of bits,
        encoding the data sequence into a codeword sequence comprising a second number of bits based on the set of state transition probabilities, the second number of bits is greater than the first number of bits, and
        providing the codeword sequence to a recording channel of a storage device; and
    a modulation decoder configured to perform the steps of
        receiving the codeword sequence from the recording channel, and decoding the data sequence from the codeword sequence based on the set of state transition probabilities.

2. The apparatus of claim 1, wherein the modulation encoder comprises a data de-compressor based on a lossless data compression scheme, and wherein the modulation decoder comprises a data compressor based on the lossless data compression scheme.

3. The apparatus of claim 1, wherein the modulation encoder comprises an arithmetic decoder based on the set of state transition probabilities, and wherein the modulation decoder comprises an arithmetic encoder based on the set of state transition probabilities.

4. The apparatus of claim 1, wherein the set of state transition probabilities comprise Markov state transition probabilities and the set is programmable.

5. The apparatus of claim 1, wherein the set of state transition probabilities is configured based on channel characteristics of the recording channel of the storage device.

6. The apparatus of claim 1, wherein the set of state transition probabilities are configured such that the codeword sequence satisfies both a deterministic constraint and a probabilistic constraint.

7. The apparatus of claim 1, wherein the set of state transition probabilities are configured such that the codeword sequence satisfies one or more of a maximum transition run ("MTR") constraint, a running digital sum ("RDS") constraint, a K-constraint, and a Nyquist constraint.

8. A method comprising steps of:
receiving a user data sequence comprising a first number of bits at a controller,
encoding the user data sequence by the controller into a codeword sequence comprising a second number of bits utilizing a data de-compressor based on a lossless data compression scheme;
outputting the codeword sequence to a data channel;
receiving the codeword sequence from the data channel; and
decoding the user data sequence by the controller from the codeword sequence utilizing a data compressor based on the lossless data compression scheme.

9. The method of claim 8, wherein the first number of bits is less than the second number of bits.

10. The method of claim 8, wherein the data de-compressor and the data compressor implement an entropy coding scheme associated with predetermined Markov state transition probabilities.

11. The method of claim 10, wherein the entropy coding scheme comprises an arithmetic coding scheme.

12. The method of claim 10, wherein the predetermined Markov state transition probabilities are configured such that the codeword sequence satisfies both a deterministic constraint and a probabilistic constraint.

13. The method of claim 10, wherein the predetermined Markov state transition probabilities are configured such that the codeword sequence satisfies one or more of a maximum transition run ("MTR") constraint, a running digital sum ("RDS") constraint, a K-constraint, and a Nyquist constraint.

14. The method of claim 8, further comprising steps of:

determining by the controller whether the codeword sequence may be decoded by the data compressor;
upon determining that the coded sequence may not be decoded by the data compressor, mapping the user data sequence by the controller to a new data sequence; and
encoding the new data sequence by the controller into a new codeword sequence utilizing the data de-compressor.

15. The method of claim 8, wherein encoding the user data sequence into the codeword sequence comprises:
mapping the user data sequence to a plurality of new, distinct data sequences;
encoding each of the new, distinct data sequences by the controller into codeword sequences in parallel data de-compressors based on the lossless data compression scheme;
determining one or more of the parallel data de-compressors by the controller wherein the encoding was successful; and
selecting the codeword sequence by the controller from one of the one or more parallel data de-compressors.

16. The method of claim 15, further comprising steps of:
upon determining that the encoding was not successful in at least one of the parallel data de-compressors, encoding the user data sequence by the controller into a new codeword sequence utilizing a conventional modulation encoder.

17. A system comprising:
a hard disk drive comprising a magnetic recording channel; and
a universal modulation encoder/decoder comprising a storage area containing a set of Markov state transition probabilities, the universal modulation encoder/decoder configured to
receive a user data sequence,
encode the user data sequence into a codeword sequence utilizing an arithmetic decoder based on the set of Markov state transition probabilities,
provide the codeword sequence to the magnetic recording channel,
receive the codeword sequence from the magnetic recording channel, and
decode a recovered user data sequence from the codeword sequence utilizing an arithmetic encoder based on the set of Markov state transition probabilities.

18. The system of claim 17, wherein the set of Markov state transition probabilities is configured based on channel characteristics of the magnetic recording channel of the hard disk drive.

19. The system of claim 17, wherein the set of Markov state transition probabilities are configured such that the codeword sequence satisfies both a deterministic constraint and a probabilistic constraint.

20. The system of claim 17, wherein the set of Markov state transition probabilities are configured such that the codeword sequence satisfies one or more of a maximum transition run ("MTR") constraint, a running digital sum ("RDS") constraint, a K-constraint, and a Nyquist constraint.

* * * * *